(12) United States Patent
Anumala

(10) Patent No.: US 9,130,764 B2
(45) Date of Patent: Sep. 8, 2015

(54) SCALING UP/OUT THE NUMBER OF BROADCAST DOMAINS IN NETWORK VIRTUALIZATION ENVIRONMENTS

(75) Inventor: Mohnish Anumala, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 13/485,697

(22) Filed: May 31, 2012

(65) Prior Publication Data

US 2013/0322441 A1 Dec. 5, 2013

(51) Int. Cl.
*H04L 12/28* (2006.01)
*H04L 12/18* (2006.01)

(52) U.S. Cl.
CPC ................................ *H04L 12/1886* (2013.01)

(58) Field of Classification Search
CPC .................................................. H04L 12/1886
See application file for complete search history.

(56) References Cited

U.S. PATENT DOCUMENTS

| | | | | |
|---|---|---|---|---|
| 8,612,559 B2* | 12/2013 | Kuik | ............................. | 709/221 |
| 2009/0073978 A1* | 3/2009 | Craddock et al. | ............. | 370/390 |
| 2009/0077268 A1* | 3/2009 | Craddock et al. | ............. | 709/250 |
| 2013/0016718 A1* | 1/2013 | Johnsen et al. | ............... | 370/390 |
| 2013/0250951 A1* | 9/2013 | Koganti | ........................ | 370/390 |
| 2013/0322443 A1* | 12/2013 | Dunbar et al. | ................ | 370/390 |

\* cited by examiner

*Primary Examiner* — Ajay Cattungal
(74) *Attorney, Agent, or Firm* — Haynes and Boone, LLP

(57) ABSTRACT

A method for handling multicast traffic is presented. A method of handling multicast traffic according to some embodiments of the present invention includes forming IP multicast (IPMC) groups of hypervisors based on broadcast domains; and directing multicast traffic from a broadcast domain on a source hypervisor to hypervisors that are members of the IPMC group.

6 Claims, 4 Drawing Sheets

SCALING UP/OUT THE NUMBER OF BROADCAST DOMAINS IN NETWORK VIRTUALIZATION ENVIRONMENTS

BACKGROUND

1. Technical Field

The present disclosure relates to multicast transmissions in a network virtualization environment and, in particular, to scaling the number of broadcast domains utilized for multicast transmissions in a network virtualization environment.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sever virtualization is placing increasing demands on the physical network infrastructure. The number of MAC addresses available for utilization throughout the switched network may be insufficient to handle the potential attachment of the substantial increase in virtual machines (VMs), each with its own MAC address within the network.

In some environments, the VMs may be grouped according to Virtual LAN (VLAN) associates. In a data center, there may be thousands of VLANs to partition traffic according to specific groups that a VM may be associated with. The current VLAN limit of 4094 may be wholly inadequate in some of these situations. In some cases, the Layer 2 network may scale across the entire data center or between data centers for efficient allocation of compute, network, and storage resources. Using traditional approaches such as the Spanning Tree Protocol (STPP) for a loop free topology can result in a large number of disabled links.

Data centers host multiple tenants, each with their own isolated set of network domains. It is not economical to realize this type of structure over dedicated infrastructure for each tenant, and therefore shared networks are commonly utilized. Further, each tenant may independently assign MAC addresses and VLAN IDs leading to potential duplication on a physical network as a whole.

One of the functions that places a large burden on such a network is multicasting in network virtualization environments. Multicasting to a group of nodes across the network may not be easily available with the networking hardware available. Further, multicasting may overburden the network with traffic being directed through many branches and arriving at unrelated nodes unnecessarily.

Therefore, there is a need for network structures that allow for efficient usage of the physical network by multiple users each with multiple virtual machines

SUMMARY

In accordance with embodiments of the present invention, a method for handling multicast traffic is presented. A method of handling multicast traffic according to some embodiments of the present invention includes forming IP multicast (IPMC) groups of hypervisors based on broadcast domains; and directing multicast traffic from a broadcast domain on a source hypervisor to hypervisors that are members of the IPMC group.

An information handling system according to some embodiments of the present invention includes an ingress table that directs network traffic according to a hypervisor association; and an egress table that directs network traffic according to the hypervisor association.

These and other embodiments will be described in further detail below with respect to the following figures.

The drawings may be better understood by reading the following detailed description.

DETAILED DESCRIPTION

Embodiments of the present invention typically operated within Layers 2 and 3 of the network, although other layers may also be included. Layer 2 refers to the data link and involves encoding and decoding individual data packets. Layer 2 furnishes the transmission protocol knowledge and management and handles errors in the physical layer, flow control and frame synchronization. Layer 3 is the network layer and provides switching and routing for the packets of Layer 2.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
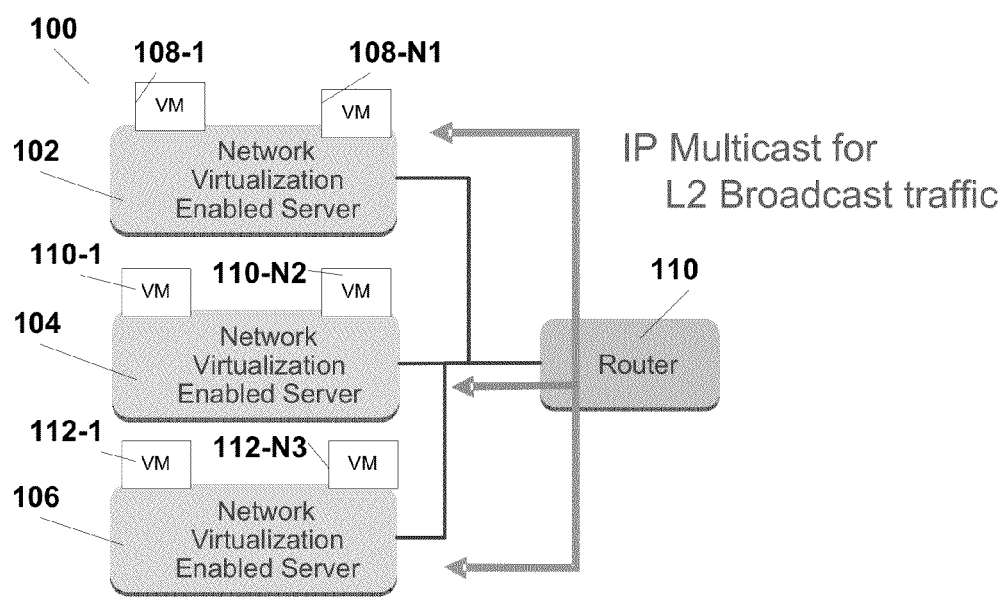
FIG. 1 illustrates at a high level IP multicast for Level 2 (L2) Broadcast Traffic.

FIG. 1 illustrates a common network environment 100. Network environment 100 includes several information handling systems, including routers and switches. As shown in FIG. 1, a router 110 routes network traffic to a number of network virtualization enabled servers, of which servers 102, 104, and 106 are illustrated. Router 110 may represent both routers and switches and may include the top-of-rack (TOR) switches coupled to servers 102, 104, and 106. Each of servers 102, 104, and 106 may host a large number of virtual machines (VMs), of which a small number are illustrated in FIG. 1. As shown in FIG. 1, server 102 includes VMs 108-1 through 108-N1; server 104 includes VMs 110-1 through 110-N2; and server 106 includes VMs 112-1 through 112-N3. N1, N2, and N3 can be any integer number. It should be noted that not all of the VMs on a particular server are associated with the same tenant. Further, VMs for a particular tenant may be distributed across multiple ones of servers 102, 104, and 106.

Each of servers 102, 104, and 106 includes a hypervisor. The hypervisor controls access by each of the virtual machines on the server to the resources of the server. The hypervisor further assures that security between virtual machines operating on the server is observed and directs network traffic to individual ones of the virtual machines.

Additionally, each of the VMs can be classified by subscription to various broadcast domains. A multicast from one VM to a particular broadcast domain may result in network traffic throughout network environment 100. The resulting high volume of network traffic, much of which may be directed towards non-recipients, can substantially slow network environment 100. With multicast protocols, network virtualization technologies require highly scalable multicast capabilities because of the large number of tenant broadcast domains Traditional network protocols may not scale sufficiently to handle multicast communications on a network environment such as environment 100. Further, hardware support for a bi-directional Protocol Independent Multicast (BiDir PIM) suite of routing protocols may not be available.

Figure 2:
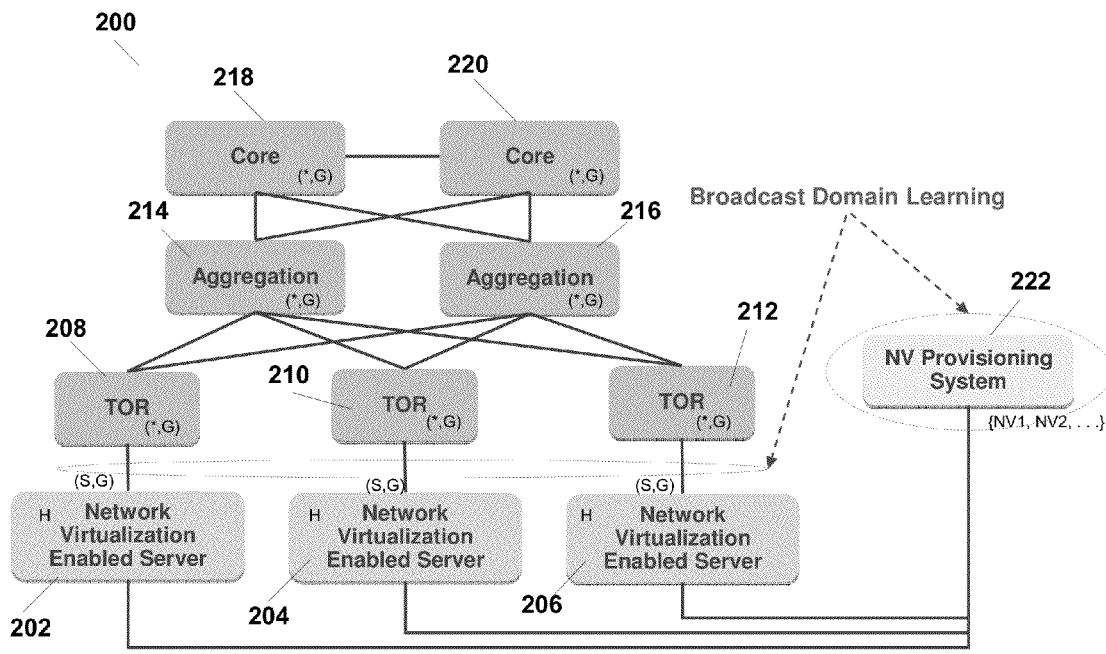
FIG. 2 illustrates a network environment according to some embodiments of the present invention.

FIG. 2 illustrates a network environment 200 according to some embodiments of the present invention. As shown in FIG. 2, network virtualization servers 202, 204, and 206 are coupled to Top-of-Rack (TOR) switches 208, 210, and 212, respectively. TOR switches 208, 210, and 212 are each coupled to Aggregators 214 and 216. Aggregators 214 and 216 are coupled to core routers 218 and 220. As shown in FIG. 2, each of servers 202, 204, and 206 are coupled to NV (broadcast domain) provisioning system 222. FIG. 2 may illustrate a portion of a much larger networking environment.

A virtual machine on server 206 may communicate with a virtual machine on server 202, for example, through TOR 212, one of aggregators 214 and 216, potentially through one or both of core routers 218 and 220, and then back down to TOR 208 and finally into server 202. Multicast transmissions originating from a virtual machine on any of the servers 202, 204, and 206 is distributed through network environment 200 to other virtual machines that are part of the same broadcast domain.

NV provisioning system 222 tracks and records broadcast domain membership information. As shown in FIG. 2, NV provisioning system 222 can learn the broadcast domain information by extracting or learning from tables in environment 200 that control routing of multicast traffic. Further, provisioning system 222 can snoop the Internet Group Management Protocol (IGMP) network traffic at an edge switch, for example at TORs 208, 210, and 212. By listening to the conversations between servers 202, 204, and 206 and TORs 208, 210, and 212, respectively, provisioning system 222 can maintain a map of network domains for multicast traffic and multicast traffic can be filtered to go to the domains that include members, and not to domains that do not have recipient members. This can prevent the flooding of network environment 200 with multicast traffic directed toward limited numbers of recipients.

The conventional method of providing a broadcast distribution is to create an IP multicast group (IPMC) per broadcast domain. However, as provided in some embodiments of the present invention, to more efficiently utilize network environment 200 IP multicast groups may be defined in terms of physical server or hypervisor connectivity.

Network environment 200 may include any number of network broadcast domains, which can be designated by the set of broadcast domains {NV1, NV2, NV3, ... }. The hypervisor on each of servers 202, 204, and 206 can thereby participate in any number broadcast domains in the set of broadcast domains Therefore, a list of broadcast domains in which a particular hypervisor $H_i$ participates can be created, where $H_i$ denotes a hypervisor operating on one of the servers such as servers 202, 204, or 206, for example. The list for each hypervisor $H_i$ is, then, $H_i=\{NVa, NVb, NVc...\}$, where NVa, NVb, and NVc are broadcast domains that are elements of the set of broadcast domains {NV1, NV2, NV3 ... } in which hypervisor $H_i$ participates. It should be noted that hypervisor $H_i$ participates in a broadcast domain $NV_d$ if any of the virtual machines of hypervisor $H_i$ are members of broadcast domain $NV_d$.

In some embodiments, IP multicast groups $G_i$ can then be created based on the basis of interacting hypervisors $H_i$. In particular, if the intersection of the set of broadcast domains associated with $H_j$ and the set of broadcast domains associated with $H_i$ is not a null set (zero) ($\{H_i \cap H_j\} \neq \{0\}$) then $H_i$ receives multicasts (*,$G_j$) and $H_j$ receives multicasts (*,$G_i$). The group $G_i$ includes hypervisor $H_j$ and the group $G_j$ includes hypervisor $H_i$. In other words, $H_i$ and $H_j$ belong to the same hypervisor group and multicasts sent from a domain associated with $H_i$ get sent to $H_j$ and multicasts sent from a domain associated with $H_j$ get sent to $H_i$. The number of multicast groups in the core and aggregation layer (cores 218 and 220 and aggregators 214 and 216 in FIG. 2) are equal to the number of hypervisor instances in the network independent of the number of broadcast domains represented. Traffic to individual virtual machines can then be handled by the hypervisor itself once it receives traffic directed to that hypervisor.

In this fashion, the number of groups G in the core and aggregation layers can be kept to a reasonable number and a course multicast distribution method can be implemented. Each of the routers, for example TORs 208, 210, and 212, aggregators 214 and 216, and cores 218 and 220 in FIG. 2, keeps a table of all of the groups so that multicasts (*,G) messages are routed to the appropriate hypervisors accordingly. Additionally, since the traffic for a particular multicast group is generated by a particular hypervisor instance (e.g., traffic for group $G_i$ is generated by hypervisor $H_i$, which is operating on a particular server), a source specific multicast tree can be calculated.

In some cases, certain broadcast domains may carry heavy broadcast traffic loads. In such cases, receipt of network traffic by unintended receivers for those broadcast domains is not efficient. For example, consider the case where the set of broadcast domains for hypervisor $H_i=\{NV_a, NV_b\}$ and the set of broadcast domains for hypervisor $H_j=\{NV_a, NV_c\}$. In that case, hypervisor $H_i$ is a member of broadcast group $G_j$ and therefore hypervisor $H_i$ receives (*, $G_j$) traffic. However, that means that hypervisor $H_i$ receives broadcast traffic from the broadcast domain $NV_c$, even though hypervisor $H_i$ does not include broadcast domain $NV_c$. Hypervisor $H_i$ then processes, and ultimately drops, the traffic from broadcast domain $NV_c$. If broadcast domain $NV_c$ carries heavy broadcast traffic, hypervisor $H_i$ may be overburdened by the need to process and discard this traffic.

In some embodiments, dedicated distribution trees can be developed. In this case, (*,G) can be listed in intermediate routers and (S,G), where S indicates source, in edge routers. The sending hypervisor server can choose one of the multiple unicast IP addresses as an IP source address in the encapsulation of the L2 multicast broadcast packet. In some embodiments, there may be a default IP source address unless that address is specified by a particular tenant. In either case, intermediate routers (e.g., aggregation and core routers) keep the (*,G) entries for scalability purposes. Edge routers, however, may keep an (S, G) table to enable fine grain broadcasts. This edge router behavior can be in TORs 208, 210, or 212 or may be in a virtual switch of servers 202, 204, or 206, or performed between a combination of edge routers.

In that fashion, the final edge router can perform a tenant ID inspection in the packet and perform the appropriate broadcast. In this fashion, unwanted broadcast traffic can be avoided with a fine grain multicast distribution. In some embodiments, some broadcast domains can have dedicated IP multicast sessions (S,G) in the network and these sessions may utilize source specific multicast trees.

In some embodiments, dedicated distribution trees can be avoided. Unintended hypervisor receivers of broadcast domains can be eliminated if the sending and receiving hypervisors have the same network virtualization broadcast domains. Consider the case where hypervisor $H_i=\{NVa, NVb\}$ and hypervisor $H_j=\{NVa, NVb, NVc\}$. As discussed above, $H_i$ is a member of group $G_j$ and therefore $H_i$ is a receiver of (*, $G_j$) traffic. Therefore, broadcast traffic for $NV_c$ reaches $H_i$. However, because all of the broadcast domains in $H_i$ are also members of $H_j$, $H_j$ will not receive unintended traffic from $H_i$.

Figure 3:
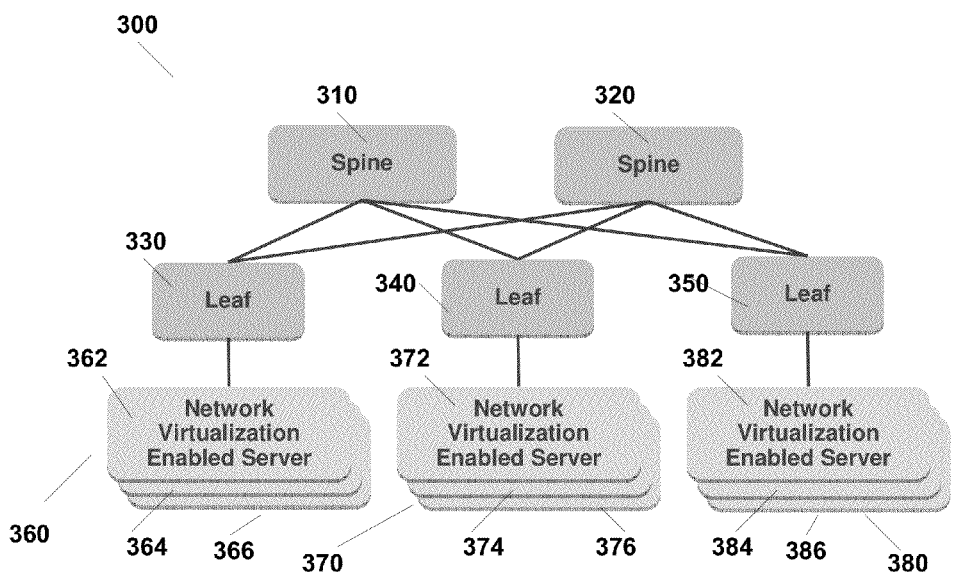
FIG. 3 illustrates a network environment according to some embodiments of the present invention.

FIG. 3 illustrates another networking environment 300 according to some embodiments of the present invention. As shown in FIG. 3, network environment 300 includes spines 310 and 320. Each of spines 310 and 320 are coupled to leafs 330, 340, and 350. Leafs 330, 340, and 350 are each coupled to a group of servers. Leaf 330 is coupled to server group 360, leaf 340 is coupled to server group 370, and leaf 350 is coupled to server group 380. Server group 360 includes servers 362, 364, and 366. Server group 370 includes servers 372, 374, and 376. Server group 382 includes servers 382, 384, and 386. Each of the servers includes a hypervisor. It should be noted that there may be any number of individual servers coupled to each of leafs 330, 340, and 350. Further there may be any number of leafs coupled to any number of spines.

Hypervisors in a rack can participate in an infinite number of network virtualized broadcast domains and can communicate with a number of other hypervisors equal to the IPMC table size in the top-of-rack component, in FIG. 3 leafs 330, 340, and 350. Spines 310 and 320 can scale out multicast sessions by effective distribution. For example, Spine 310 can include distribution tables {IPMCa, IPMCb, IPMCc} while Spine 320 can include distribution tables {IPMCx, IPMCy, and IPMCz}. The distribution sets in Spine 310 and Spine 320 can be different, or may overlap. Consequently, the total IPMC table size is equal to Count Of {Spine 310 tables U Spine 320 tables}.

Figure 4:
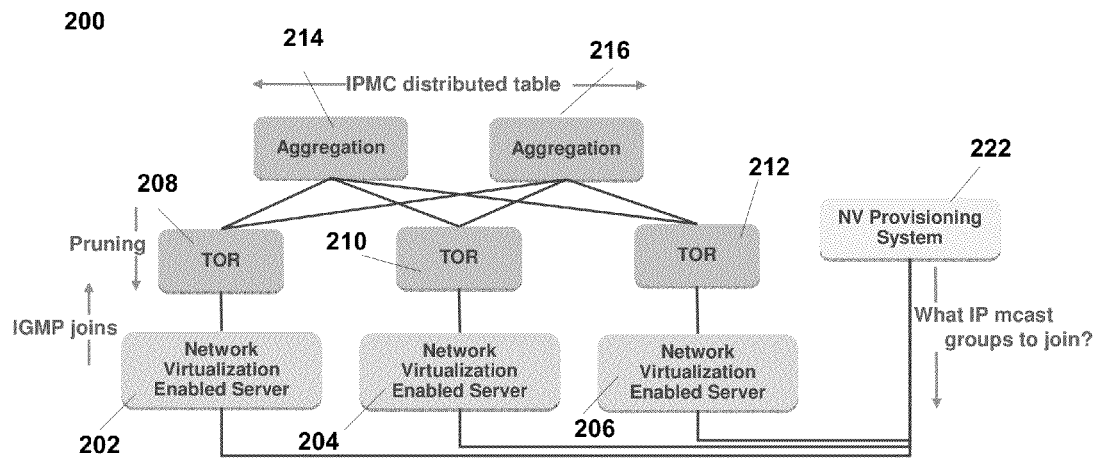
FIG. 4 illustrates distribution of table construction in a network environment such as that illustrated in FIG. 2.

FIG. 4 illustrates organization of IPMC tables according to some embodiments of the present invention. As illustrated in FIG. 4, NV provisioning system 222 tracks the multi-cast groups on broadcast domains as discussed above. Further, provisioning system 222 keeps track of IGMP group joins and pruning of broadcast domains in TORs 208, 210, and 212. The IPMC distribution tables can be kept and distributed at aggregators 214 and 216.

Figure 5:
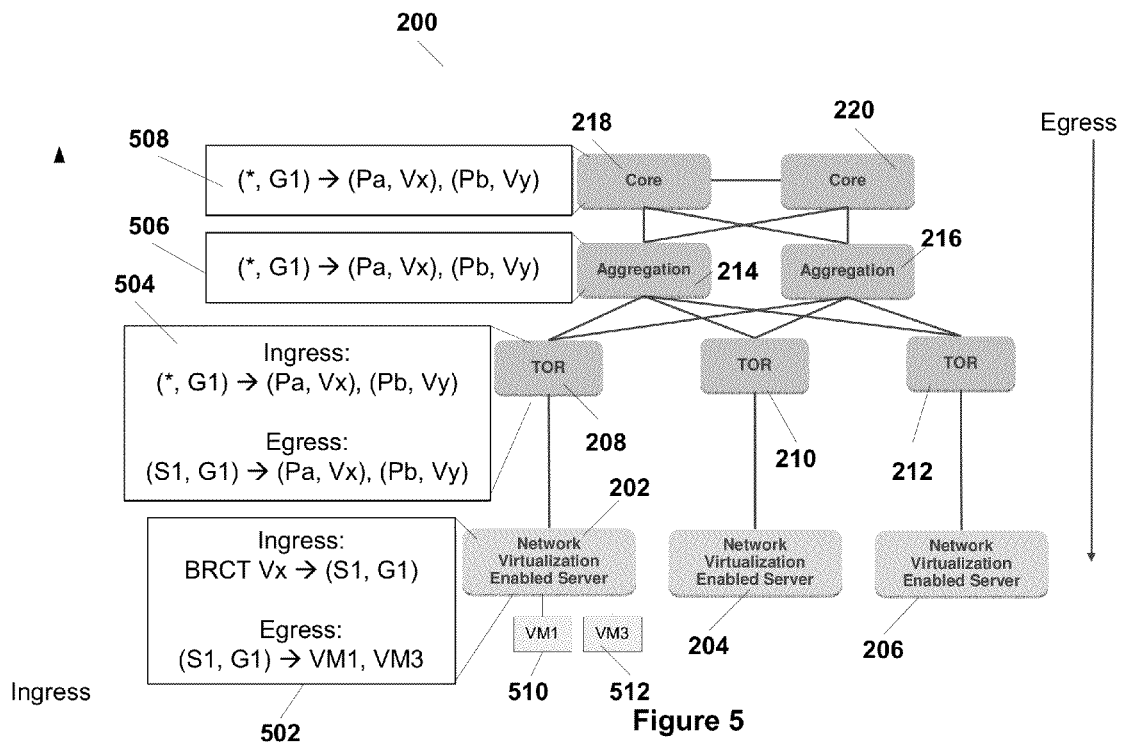
FIG. 5 illustrates IPMC table construction according to some embodiments of the present invention.

FIG. 5 illustrates table construction at each of the levels of network environment 200. As shown in FIG. 5, servers 202, 204, and 206 keep a table 502 that includes relationships for network traffic in both egress (out of server the server) and ingress (into the server) direction. As shown in FIG. 5, in table 502 associated with the hypervisor of server 202 traffic from virtual machines VM1 510 and VM3 512, both of which are in related network domains, point to (S1, G1). In table 502, Egress traffic from (S1, G1) is linked to virtual machines VM1 510 and VM3 512, which belong to the same network domains. The ingress part of table 502 lists traffic to (S1, G1) from Broadcast Domain VLAN x (BRCT Vx). Table 504 is provided in TOR 208, which is coupled to server 202. In Table 504, the ingress path is listed such that (*, G1) is directed to paths Port a, VLAN x (Pa, Vx), and port b VLAN y (Pb, Vy), for example. The egress path is listed such that (S1, G1) is directed to the same physical and virtual address (Pa, Vx), (Pb, Vy). Table 506, which is provided in aggregator 214, includes the table entry (*,G1) directed to (Pa, Vx), (Pb, Vy). Further, Table 508, which is provided in core 218, includes the table entry (*, G1) which directs to (Pa, Vx), (Pb, Vy).

Figure 6A:
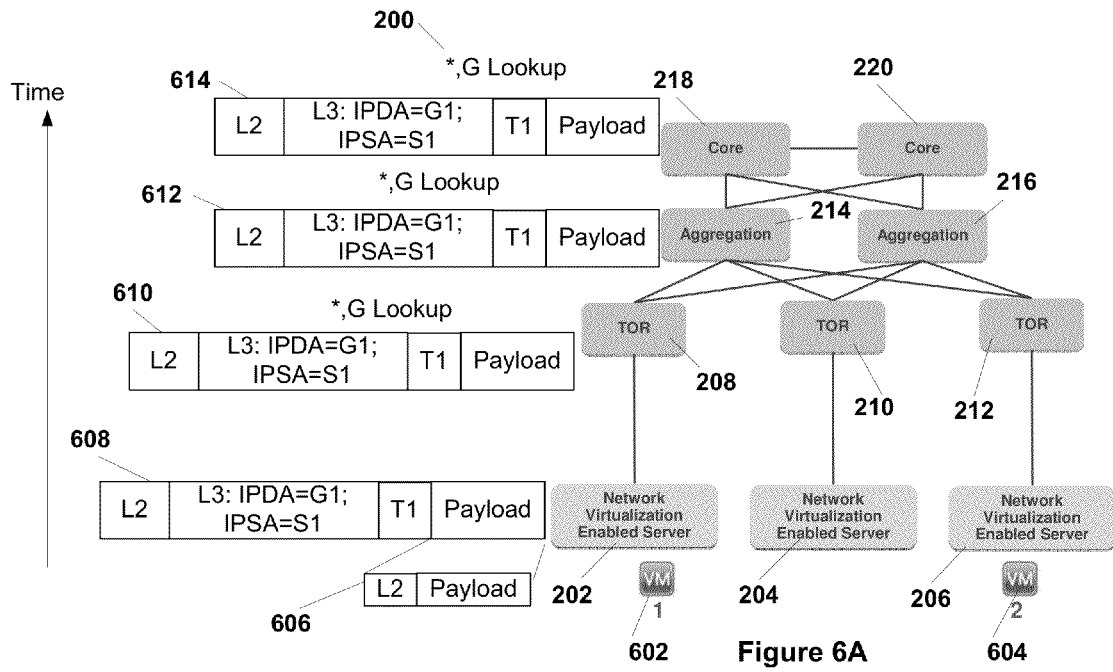
FIGS. 6A and 6B illustrate a packet transport through a network configure according to some embodiments of the present invention.
Figure 6B:
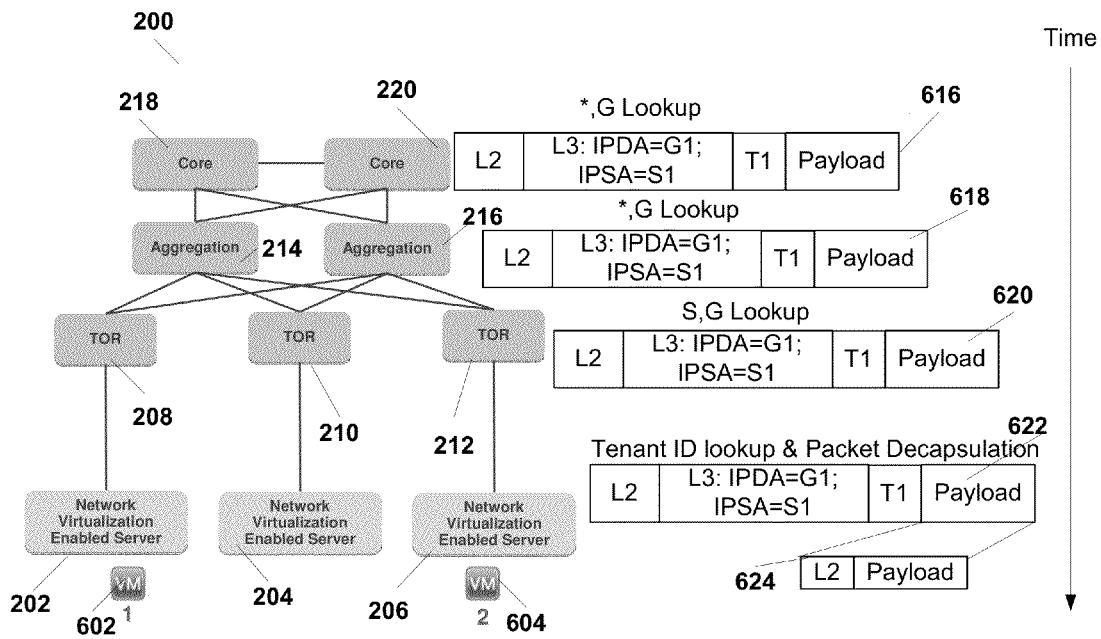

FIGS. 6A and 6B illustrate a packet walk through network environment 200 according to some embodiments of the present invention. FIGS. 6A and 6B illustrate a multicast packet originating at virtual machine 602, which resides on server 202. The packet is received by virtual machine 604, which resides on server 206.

As shown in FIG. 6A, packet 606, which is generated by virtual machine 602, is encapsulated into packet 608 by server 202. Packet 608 includes packet 606 in its payload version, and adds a tenant ID T1, sets the destination address as G1 (the group associated with the hypervisor on server 202), and sets the source address to S1 according to the ingress lookup table on server 202. Packet 608 is then transmitted to TOR 208. TOR 208 utilizes the ingress lookup table for (*, G) and transmits packet 610 to aggregator 214. Aggregator 214 utilizes the ingress lookup table (*,G) and transmits packet 612 to core 218. Core 218 utilizes the lookup table (*, G) and transmits packet 614 to core 220. As shown in FIG. 6A, packets 608, 610, 612, and 614 are the same and are routed through environment 200 according to the appropriate look-up tables.

As shown in FIG. 6B, core 220 utilizes lookup table (*, G) and transmits packet 616 to aggregator 216. Aggregator 216 utilizes lookup table (*, G) and transmits packet 618 to TOR 212. TOR 212 checks lookup table (S, G) and transmits packet 620 to server 206. Server 206 then checks the tenant ID, and unpacks packet 620 to retrieve packet 624. Server 206 then transmits packet 624 to virtual machine 604.

FIGS. 6A and 6B provide an example of the rout of a multicast transmission from virtual machine 602 to virtual machine 604 according to some embodiments of the present invention. One skilled in the art will recognize that other routing paths through environment 200 are available for transmissions between virtual machines 602 and 604.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A method of handling multicast traffic, comprising:
    forming an IP multicast (IPMC) group for each of a plurality of hypervisors in a network, each IPMC group including others of the hypervisors based on broadcast domains participated in by the hypervisors; and
    directing multicast traffic from a broadcast domain on a source hypervisor to hypervisors that are members of the IPMC group associated with the source hypervisor;
    wherein forming each IPMC group comprises:
        determining a set of broadcast domains participated in by each of the hypervisors; and
        for each hypervisor, defining the IPMC group associated with that hypervisor as including each of the hypervisors that share at least one broadcast domain with that hypervisor.

2. The method of claim 1, further including directing multicast traffic at an edge switch according to a source indication.

3. The method of claim 2, wherein the source identification is utilized by the receiving hypervisor to discard traffic.

4. The method of claim 1, wherein directing multicast traffic includes
    embedding a multicast packet from a source virtual machine into a transmission packet, the transmission packet including a source address set to the source hypervisor and a destination address set to the group associated with the source hypervisor;
    transmitting the transmission packet to a top-of-rack associated with the source hypervisor;
    utilizing a multicast lookup table formed from the IPMC groups, transmitting the transmission packet to at least one network component;
    utilizing the multicast lookup table, transmitting the transmission packet to a top-of-rack associated with a hypervisor in the IPMC group associated with the source hypervisor;
    transmitting the transmission packet to a receiving hypervisor;
    unpacking the transmission packet to recover the multicast packet; and
    transmitting the multicast packet to a receiving virtual machine.

5. The method of claim 4, wherein the transmission packet includes a tenant identifier.

6. The method of claim 1, wherein determining the set of broadcast domains participated in by a particular hypervisor comprises determining which broadcast domains any virtual machines of the particular hypervisor are members of.

* * * * *